(12) United States Patent
Hirose et al.

(10) Patent No.: US 10,640,128 B2
(45) Date of Patent: May 5, 2020

(54) VEHICLE CONTROL DEVICE, VEHICLE CONTROL METHOD, AND STORAGE MEDIUM

(71) Applicant: HONDA MOTOR CO., LTD., Minato-ku, Tokyo (JP)

(72) Inventors: Takafumi Hirose, Wako (JP); Kentaro Ishisaka, Wako (JP); Takashi Watanabe, Wako (JP); Takemi Tsukada, Wako (JP); Katsuya Yashiro, Wako (JP); Toru Kokaki, Wako (JP); Hisashi Matsuda, Wako (JP); Masaya Ikeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/292,402

(22) Filed: Mar. 5, 2019

(65) Prior Publication Data
US 2019/0283775 A1 Sep. 19, 2019

(30) Foreign Application Priority Data
Mar. 13, 2018 (JP) ................................. 2018-045837

(51) Int. Cl.
| | |
|---|---|
| B60Q 1/00 | (2006.01) |
| B60W 50/14 | (2020.01) |
| G06K 9/00 | (2006.01) |
| B60W 40/08 | (2012.01) |
| G05D 1/00 | (2006.01) |

(52) U.S. Cl.
CPC ............ *B60W 50/14* (2013.01); *B60W 40/08* (2013.01); *G05D 1/0088* (2013.01); *G06K 9/00791* (2013.01); *G06K 9/00845* (2013.01); *B60W 2050/146* (2013.01); *B60W 2550/30* (2013.01); *G05D 2201/0213* (2013.01)

(58) Field of Classification Search
CPC .... B60W 50/14; B60W 40/08; G05D 1/0088; G06K 9/00791; G06K 9/00845
See application file for complete search history.

(56) References Cited

U.S. PATENT DOCUMENTS

| | | | |
|---|---|---|---|
| 10,077,056 B1 * | 9/2018 | Fields ..................... | G06Q 40/08 |
| 2006/0235615 A1 * | 10/2006 | Kato ..................... | B60W 40/04 |
| | | | 701/300 |

(Continued)

FOREIGN PATENT DOCUMENTS

| | | |
|---|---|---|
| JP | 2012-022504 | 2/2012 |
| JP | 2017-198505 | 11/2017 |

*Primary Examiner* — Phung Nguyen
(74) *Attorney, Agent, or Firm* — Amin, Turocy & Watson, LLP

(57) ABSTRACT

A vehicle control device including: a recognizer (13) that recognizes a surrounding situation of a subject vehicle; a driving controller (140 or 160) that executes driving control of controlling one or both of steering and acceleration/deceleration of the subject vehicle on the basis of the surrounding situation recognized by the recognizer; and a notifier (30 or 180) that notifies a vehicle occupant of the subject vehicle of predetermined information, wherein the driving controller sets a degree of margin for a surrounding environment set in the driving control after start of the notification of the predetermined information using the notifier to be higher than that before start of the notification of the predetermined information.

11 Claims, 8 Drawing Sheets

(56) References Cited

U.S. PATENT DOCUMENTS

2012/0203426 A1* 8/2012 Held ................... B60W 40/09
                                                    701/36
2017/0341648 A1* 11/2017 Sanma ................ B60N 3/06
2018/0105184 A1* 4/2018 Urano ................. B60W 30/09

* cited by examiner

| VEHICLE OCCUPANT ID | ADDRESS INFORMATION | TASTES INFORMATION |
|---|---|---|
| U001 | * * * | * * * |
| U002 | * * * | * * * |
| ... | ... | ... |

| VEHICLE OCCUPANT ID | DATE AND TIME INFORMATION | LANDSCAPE FEATURE ID | PRESENCE/ABSENCE OF INTEREST |
|---|---|---|---|
| U001 | * * * | P001 | PRESENCE |
| | * * * | P002 | ABSENCE |
| | ... | ... | ... |
| U002 | * * * | P003 | PRESENCE |
| | * * * | P004 | PRESENCE |
| | ... | ... | ... |
| ... | ... | ... | ... |

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-045837, filed Mar. 13, 2018, the content of which is incorporated herein by reference.

BACKGROUND

Field of the Invention

The present invention relates to a vehicle control device, a vehicle control method, and a storage medium.

Description of Related Art

In recent years, automated control of vehicles has been researched. In relation to this, technologies for determining a looking-aside state of a vehicle occupant with a road state taken into account and changing an automated driving plan on the basis of factors not depending on a running situation at the time of automated driving are known (for example, Japanese Unexamined Patent Application, First Publication Nos. 2012-22504 and 2017-198505).

SUMMARY

In these conventional technologies, in a case in which a vehicle occupant performs a predetermined behavior not relating to running of a vehicle, a degree of adjustment of driving control of the vehicle is not considered.

The present invention is realized in consideration of such situations, and one object thereof is to provide a vehicle control device, a vehicle control method, and a storage medium capable of executing more appropriate driving control even in a case in which a vehicle occupant performs a predetermined behavior not relating to running of the vehicle.

A vehicle control device, a vehicle control method, and a storage medium according to the present invention employ the following configurations.

(1): According to one aspect of the present invention, there is provided a vehicle control device including: a recognizer that recognizes a surrounding situation of a subject vehicle; a driving controller that executes driving control of controlling one or both of steering and acceleration/deceleration of the subject vehicle on the basis of the surrounding situation recognized by the recognizer; and a notifier that notifies a vehicle occupant of the subject vehicle of predetermined information, wherein the driving controller sets a degree of margin for a surrounding environment set in the driving control after start of the notification of the predetermined information using the notifier to be higher than that before start of the notification of the predetermined information.

(2): In the aspect (1) described above, a vehicle occupant state estimator that estimates a state of the vehicle occupant of the subject vehicle is further included, and, in a case in which it is estimated by the vehicle occupant state estimator that the vehicle occupant has performed a specific behavior after the notification of the predetermined information using the notifier, the driving controller sets the degree of margin for the surrounding environment set in the driving control to be higher than that before start of the notification of the predetermined information.

(3): In the aspect (1) described above, the predetermined information includes guidance information based on a landscape feature.

(4): In the aspect (1) described above, the driving controller determines whether or not there is a need to notify the vehicle occupant of the predetermined information and causes the notifier to notify the predetermined information in a case in which it is determined that there is a need to notify the vehicle occupant.

(5): In the aspect (4) described above, the driving controller determines whether or not there is a need to notify the vehicle occupant of the predetermined information on the basis of presence/absence of interest of the vehicle occupant in the predetermined information.

(6): In the aspect (1) described above, the vehicle occupant includes a driver and a passenger of the subject vehicle.

(7): In the aspect (1) described above, the driving controller executes the driving control in a plurality of modes including a first driving mode and a second driving mode having a rate of automation of the driving control which is higher than in the first driving mode or having less required tasks for the vehicle occupant than in the first driving mode and causes the notifier to notify predetermined information in a case in which driving control according to the second driving mode is executed.

(8): In the aspect (1) described above, the degree of margin includes at least one of a clearance between the subject vehicle and another vehicle, a speed of the subject vehicle, and a running position of the subject vehicle.

(9): According to another aspect of the present invention, there is provided a vehicle control device including: a recognizer that recognizes a surrounding situation of a subject vehicle; a driving controller that executes driving control of controlling one or both of steering and acceleration/deceleration of the subject vehicle on the basis of the surrounding situation recognized by the recognizer; and a notifier that notifies a vehicle occupant of the subject vehicle of predetermined information, wherein the driving controller sets a degree of margin for a surrounding environment set in the driving control after a predetermined time before start of the notification of the predetermined information using the notifier to be higher than that before the predetermined time before start of the notification of the predetermined information.

(10): According to another aspect of the present invention, there is provided a vehicle control method using a vehicle control device, the vehicle control method including: recognizing a surrounding situation of a subject vehicle; executing driving control of controlling one or both of steering and acceleration/deceleration of the subject vehicle on the basis of the recognized surrounding situation; notifying a vehicle occupant of the subject vehicle of predetermined information; and setting a degree of margin for a surrounding environment set in the driving control after start of the notification of the predetermined information to be higher than that before start of the notification of the predetermined information.

(11): According to another aspect of the present invention, there is provided a computer-readable non-transitory storage medium having a program stored thereon, the program causing a vehicle control device to execute: recognizing a surrounding situation of a subject vehicle; executing driving control of controlling one or both of steering and acceleration/deceleration of the subject vehicle on the basis of the recognized surrounding situation; notifying a vehicle occupant of the subject vehicle of predetermined information; and setting a degree of margin for a surrounding environment set in the driving control after start of the notification of the predetermined information to be higher than that before start of the notification of the predetermined information.

According to the aspects (1) to (11) described above, more appropriate driving control can be executed even in a case in which a vehicle occupant performs a predetermined behavior not relating with running of the vehicle.

BRIEF DESCRIPTION OF THE DRAWINGS

FIG. 4 is a diagram illustrating one example of contents of a vehicle occupant information DB;

FIG. 5 is a diagram illustrating one example of contents of a notification history;

DESCRIPTION OF EMBODIMENTS

Hereinafter, a vehicle control device, a vehicle control method, and a storage medium according to an embodiment of the present invention will be described with reference to the drawings. A vehicle control device according to an embodiment is applied to an automated driving vehicle. Automated driving, for example, is execution of driving control by controlling one or both of steering and acceleration/deceleration of a vehicle. Driving modes that can be executed by an automated driving vehicle include a first driving mode and a second driving mode that has a higher rate of automation of driving control than in the first driving mode or has less required tasks for a vehicle occupant than in the first mode. The required tasks, for example, include an operation for a driving operator and monitoring the surroundings of a subject vehicle M. In a case in which driving control according to the first and second driving modes is executed, a degree of margin for a surrounding environment is set in advance, and a timing at which required tasks are imposed on a vehicle occupant, switching between driving modes, and the like are controlled on the set degree of margin. Here, a degree of margin, for example, includes at least one of a clearance for an obstacle or the like, a speed of a vehicle, and a running position of a vehicle estimated as being sufficient for avoiding a contact with the obstacle or the like for a surrounding environment based on road situations such as a road pattern, a state of a road surface, weather, and the like, a position of the obstacle, a behavior, and the like. Hereinafter, although a case in which a rule of left-side traffic is applied will be described, the left side and the right side may be interchanged in a case in which a rule of right-side traffic is applied.

[Entire Configuration]

Figure 1:
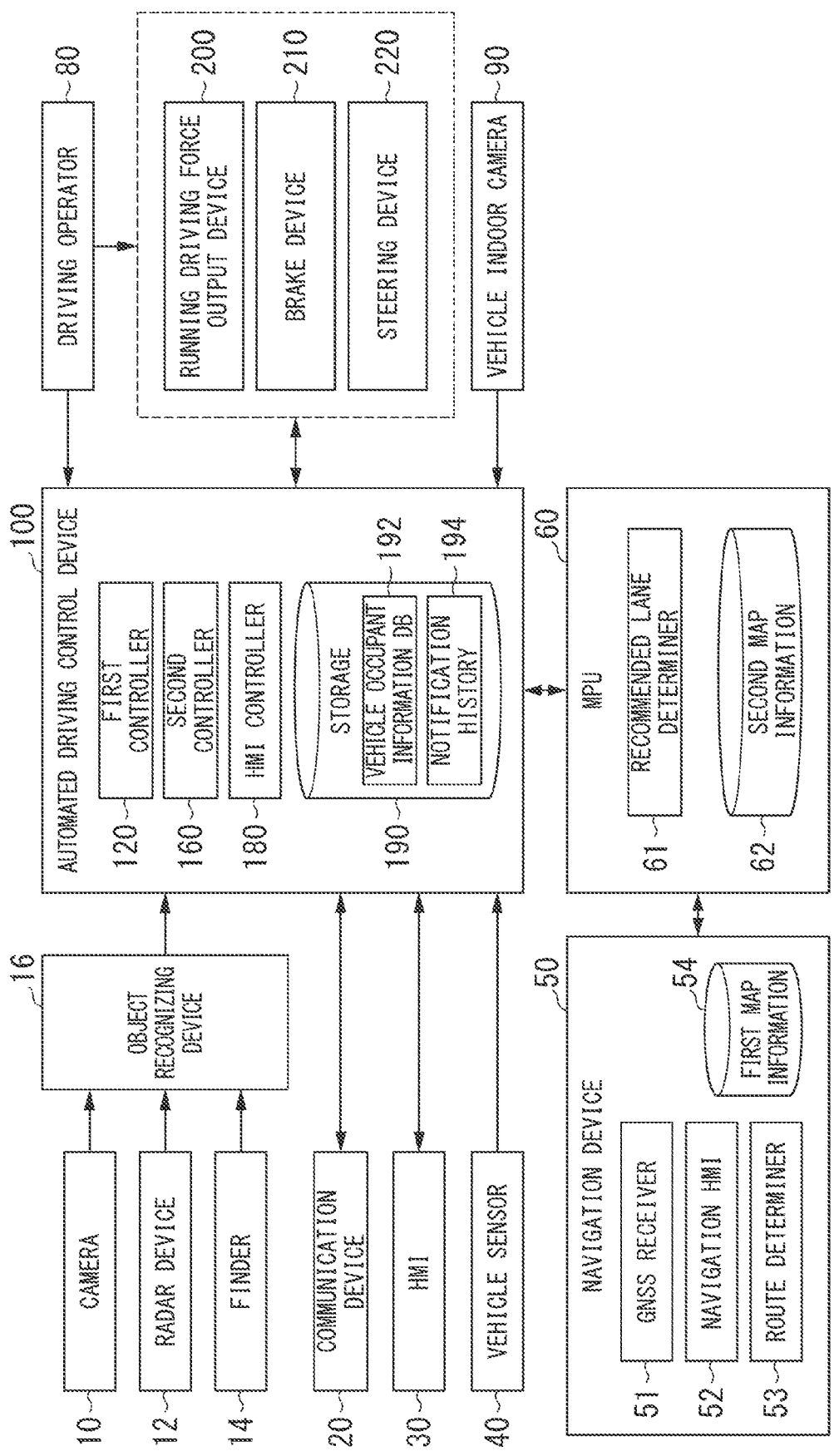
FIG. 1 is a configuration diagram of a vehicle system using a vehicle control device according to an embodiment.

FIG. 1 is a configuration diagram of a vehicle system 1 using a vehicle control device according to an embodiment. A vehicle in which the vehicle system 1 is mounted is, for example, a vehicle having two wheels, three wheels, four wheels, or the like, and a driving source thereof is an internal combustion engine such as a diesel engine or a gasoline engine, an electric motor, or a combination thereof. The electric motor operates using power generated using a power generator connected to an internal combustion engine or power discharged from a secondary cell or a fuel cell.

The vehicle system 1, for example, includes a camera 10, a radar device 12, a finder 14, an object recognizing device 16, a communication device 20, a human machine interface (HMI) 30, a vehicle sensor 40, a navigation device 50, a map positioning unit (MPU) 60, a driving operator 80, a vehicle indoor camera 90, an automated driving control device 100, a running driving force output device 200, a brake device 210, and a steering device 220. Such devices and units are interconnected using a multiplex communication line such as a controller area network (CAN) communication line, a serial communication line, a radio communication network, or the like. The configuration illustrated in FIG. 1 is merely one example, and thus parts of the configuration may be omitted or other additional components may be added. The automated driving control device 100 is one example of a "vehicle control device". A combination of the HMI 30 and the HMI controller 180 is one example of a "notifier".

The camera 10, for example, is a digital camera using a solid-state imaging device such as a charge coupled device (CCD) or a complementary metal oxide semiconductor (CMOS). The camera 10 is installed at an arbitrary place on a vehicle in which the vehicle system 1 is mounted (hereinafter referred to as a subject vehicle M). In the case of forward imaging, the camera 10 is installed at an upper part of a front windshield, a rear face of a rear-view mirror, or the like. The camera 10, for example, repeatedly images the vicinity of the subject vehicle M periodically. The camera 10 may be a stereo camera.

The radar device 12 emits radio waves such as millimeter waves to the vicinity of the subject vehicle M and detects at least a position of (a distance and an azimuth to) an object by detecting radio waves (reflected waves) reflected by the object. The radar device 12 is installed at an arbitrary place on the subject vehicle M. The radar device 12 may detect a position and a speed of an object using a frequency modulated continuous wave (FM-CW) system.

The finder 14 is a light detection and ranging (LIDAR) device. The finder 14 emits light to the vicinity of the subject vehicle M and measures scattered light. The finder 14 detects a distance with respect to a target on the basis of a time from light emission to light reception. The emitted light, for example, is pulse-form laser light. The finder 14 is mounted at an arbitrary position on the subject vehicle M.

The object recognizing device 16 may perform a sensor fusion process on results of detection using some or all of the camera 10, the radar device 12, and the finder 14, thereby allowing recognition of a position, a type, a speed, and the like of an object. The object recognizing device 16 outputs a result of recognition to the automated driving control device 100. The object recognizing device 16 may output results of detection using the camera 10, the radar device 12, and the finder 14 to the automated driving control device 100 as they are. The object recognizing device 16 may be omitted from the vehicle system 1. The camera 10 includes an infrared camera imaging changes in the surface temperature of an object in addition to a camera imaging a general image. Switching between general imaging and infrared imaging may be performed using functions included in the camera 10.

The communication device 20, for example, communicates with other vehicles present in the vicinity of the subject vehicle M using a cellular network, a Wi-Fi network, Bluetooth (registered trademark), dedicated short range communication (DSRC), or the like or communicates with various server apparatuses through a radio base station.

The HMI 30 presents various types of information to an occupant of the subject vehicle M and receives an input operation performed by a vehicle occupant. The HMI 30 includes various display devices, a speaker, a buzzer, a touch panel, switches, keys, light emitting devices disposed inside a vehicle cabin, and the like.

The vehicle sensor 40 includes a vehicle speed sensor that detects a speed of the subject vehicle M, an acceleration sensor that detects an acceleration, a yaw rate sensor that detects an angular velocity around a vertical axis, an azimuth sensor that detects the azimuth of the subject vehicle M, and the like.

The navigation device 50, for example, includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of a subject vehicle M on the basis of signals received from GNSS satellites. The position of the subject vehicle M may be identified or complemented by an inertial navigation system (INS) using an output of the vehicle sensor 40. The navigation HMI 52 includes a display device, a speaker, a touch panel, a key, and the like. A part or the whole of the navigation HMI 52 and the HMI 30 described above may be configured to be shared. The route determiner 53, for example, determines a route to a destination input by a vehicle occupant using the navigation HMI 52 (hereinafter referred to as a route on a map) from a position of the subject vehicle M identified by the GNSS receiver 51 (or an input arbitrary position) by referring to the first map information 54. The first map information 54, for example, is information in which a road form is represented by respective links representing roads and respective nodes connected using the links. The first map information 54 may include a curvature of each road, point of interest (POI) information, and the like. The first map information 54 may include information relating to landscape features. The information relating to landscape features includes landscape feature IDs that are identification information of landscape features, positional information of landscape features, attributes (genres) of landscape features, and guidance information based on landscape features. Landscape features, for example, include landmarks, sightseeing areas (for example, mountains, waterfalls, and lakes), famous buildings (for example, temples and bridges), and commercial facilities such as theme parks and shopping malls. After computer processing, an object may be a point on the map or an area having an area. The information relating to landscape features may be set as a default in the first map information 54 or may be acquired from a map server or the like through the Internet or the like. The route on the map is output to the MPU 60. The navigation device 50 may perform route guidance using the navigation HMI 52 on the basis of the route on the map. The navigation device 50, for example, may be realized by a function of a terminal device such as a smartphone or a tablet terminal held by a vehicle occupant. The navigation device 50 may transmit a current location and a destination to a navigation server through the communication device 20 and acquire a route equivalent to the route on the map received from the navigation server.

The MPU 60, for example, includes a recommended lane determiner 61 and stores second map information 62 in a storage device such as an HDD or a flash memory. The recommended lane determiner 61 divides the route on the map provided from the navigation device 50 into a plurality of blocks (for example, divides the route into blocks of 100 [m] in the advancement direction of the vehicle) and determines a recommended lane for each block by referring to the second map information 62. The recommended lane determiner 61 determines in which of lanes numbered from the left side to run. In a case in which there is a branching place in the route on the map, the recommended lane determiner 61 determines a recommended lane such that the subject vehicle M can run along a reasonable route for advancement to a branching destination.

The second map information 62 is map information having higher accuracy than the first map information 54. The second map information 62, for example, includes information on the centers of respective lanes, information on boundaries between lanes, or the like. In addition, in the second map information 62, road information, traffic regulation information, address information (addresses and postal codes), facility information, telephone number information, and the like may be included. The second map information 62 may be updated as needed by the communication device 20 communicating with another device.

The driving operator 80, for example, includes an acceleration pedal, a brake pedal, a shift lever, a steering wheel, a steering wheel variant, a joystick, and other operators. A sensor detecting the amount of an operation or the presence/absence of an operation is installed in the driving operator 80, and a result of the detection is output to the automated driving control device (vehicle control device) 100 or some or all of the running driving force output device 200, the brake device 210, and the steering device 220.

The vehicle indoor camera 90, for example, captures an image including a face of a vehicle occupant sitting on a seat disposed inside the vehicle cabin of the subject vehicle M. A vehicle occupant, for example, is a vehicle occupant sitting on a driver's seat and may additionally include a vehicle occupant (passenger) sitting on an assistant driver's seat or a rear seat. The vehicle indoor camera 90, for example, is a digital camera using a solid-state imaging device such as a charge coupled device (CCD) or a complementary metal oxide semiconductor (CMOS). The vehicle indoor camera 90, for example, images a vehicle occupant at a predetermined timing. The image captured by the vehicle indoor camera 90 is output to the first controller 120.

The automated driving control device 100, for example, includes a first controller 120, a second controller 160, an HMI controller 180, and a storage 190. Each of such constituent elements, for example, is realized by a hardware processor such as a central processing unit (CPU) executing a program (software). Some or all of these constituent elements may be realized by hardware (a circuit unit; including circuitry) such as a large scale integration (LSI), an application specific integrated circuit (ASIC), a field-programmable gate array (FPGA), or a graphics processing unit (GPU) or may be realized by software and hardware in cooperation. The program may be stored in a storage device such as a hard disk drive (HDD) or a flash memory of the automated driving control device 100 in advance or may be stored in a storage medium such as a DVD or a CD-ROM that can be loaded or unloaded and installed in an HDD or a flash memory of the automated driving control device 100 by loading the storage medium into a drive device. A combination of the action plan generator 140 and the second controller 160 is one example of a "driving controller". The driving controller, for example, executes driving control by controlling one or both of steering and acceleration/deceleration of the subject vehicle M on the basis of the surrounding situation recognized by the recognizer 130.

Figure 2:
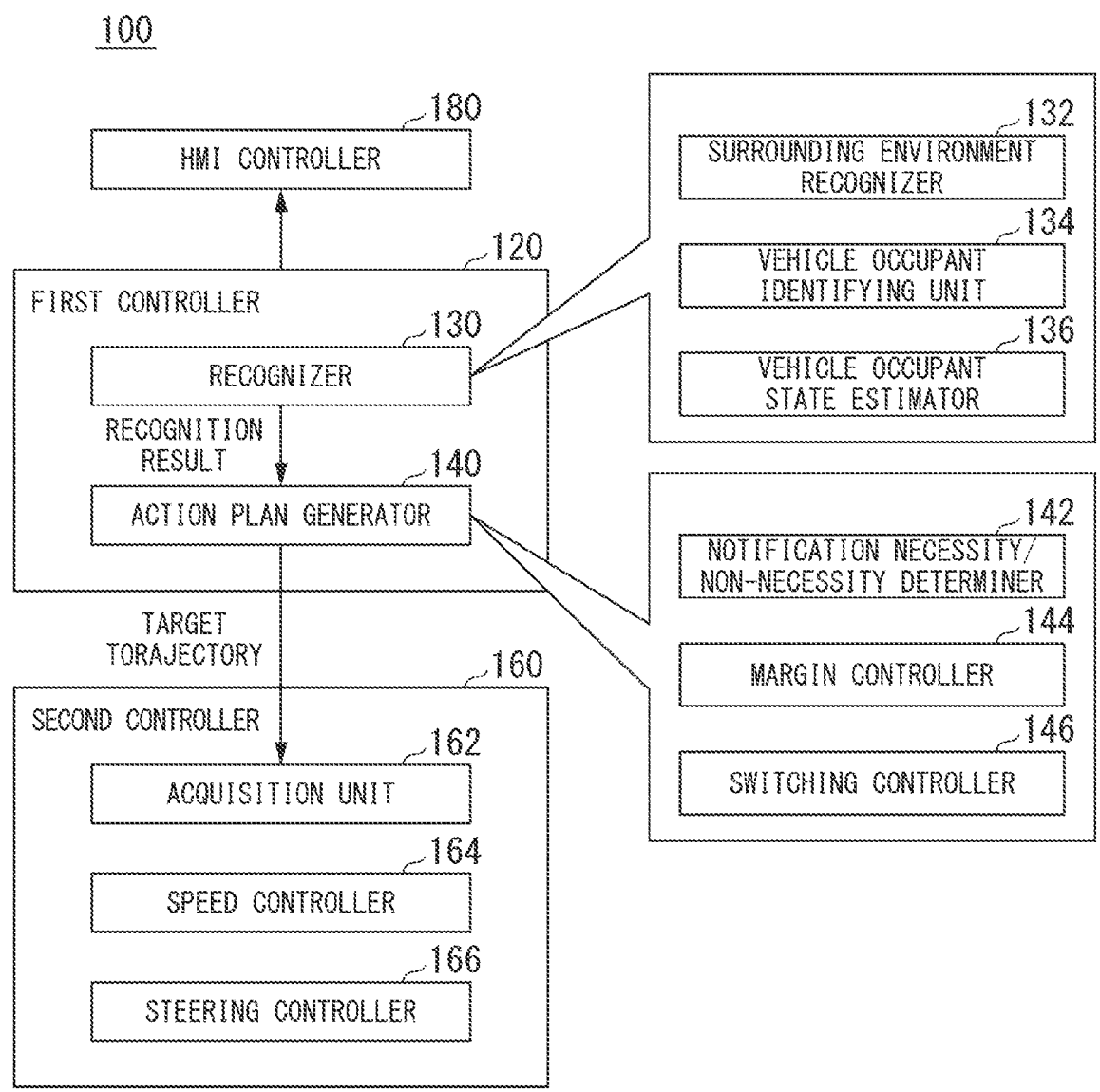
FIG. 2 is a functional configuration diagram of a first controller, a second controller, and an HMI controller.

FIG. 2 is a functional configuration diagram of the first controller 120, the second controller 160, and the HMI controller 180. The first controller 120, for example, includes a recognizer 130 and an action plan generator 140. The first controller 120, for example, simultaneously realizes functions using artificial intelligence (AI) and functions using a model provided in advance. For example, a function of "recognizing an intersection" may be realized by executing recognition of an intersection using deep learning or the like and recognition based on conditions given in advance (a traffic light, road markings, and the like that can be used for pattern matching are present) at the same time and comprehensively evaluating both recognitions by assigning scores to them. Accordingly, the reliability of automated driving is secured.

The recognizer 130 recognizes states such as a position, orientation, a speed, an acceleration, and the like of each object present in the vicinity of the subject vehicle M on the basis of information input from the camera 10, the radar device 12, and the finder 14 through the object recognizing device 16. Objects, for example, include moving bodies such as pedestrians and other vehicles and obstacles such as construction sites. The position of an object, for example, is recognized as a position in a relative coordinate system having a representative point (the center of gravity, the center of a driving shaft, or the like) of the subject vehicle M as its origin and is used for control. The position of an object may be represented as a representative point such as the center of gravity or a corner of an object or may be represented in a represented area. A "state" of the object may include an acceleration, a jerk, or an "action state" (for example, whether or not the object is changing lanes or is to change lanes) of an object.

For example, the recognizer 130, for example, recognizes a lane in which the subject vehicle M is running (running lane). For example, the recognizer 130 recognizes a running lane by comparing a pattern of road partition lines (for example, an arrangement of solid lines and broken lines) of road partition lines acquired from the second map information 62 with a pattern of road partition lines in the vicinity of the subject vehicle M recognized from an image captured by the camera 10. The recognizer 130 may recognize a running lane by recognizing running road boundaries (road boundaries) including road partition lines, road shoulders, curbstones, a median strip, guard rails, and the like instead of road partition lines. In this recognition, the location of the subject vehicle M acquired from the navigation device 50 or a processing result acquired by the INS may be taken into account as well. The recognizer 130 may recognize a width, a height, a shape, and the like of an obstacle on the basis of an image captured by the camera 10. The recognizer 130 recognizes a sidewalk, a temporary stop line, an obstacle, a red light, a tollgate, and other road events.

When recognizing a running lane, the recognizer 130 recognizes a position and a posture of the subject vehicle M with respect to the running lane. The recognizer 130, for example, may recognize a deviation of a reference point of the subject vehicle M from the center of the lane and an angle formed with respect to a line in which the center of the lane in the advancement direction of the subject vehicle M is aligned as a relative position and a posture of the subject vehicle M with respect to the running lane. Instead of this, the recognizer 130 may recognize the position of the reference point of the subject vehicle M with respect to one side end part (a road partition line or a road boundary) of the running lane or the like as a relative position of the subject vehicle M with respect to the running lane. The recognizer 130 may recognize structures (for example, an electric pole, a median strip, and the like) on the road on the basis of the first map information 54 or the second map information 62. The functions of a surrounding situation recognizer 132, a vehicle occupant identifying unit 134, and a vehicle occupant state estimator 136 of the recognizer 130 will be described later.

The action plan generator 140 automatically (without depending on a driver's operation) generates a target torajectory along which the subject vehicle M will run in the future such that the subject vehicle basically can run on a recommended lane determined by the recommended lane determiner 61 and can respond to a surrounding situation of the subject vehicle M. The target torajectory, for example, includes a speed element. For example, the target torajectory is represented as a sequence of places (torajectory points) at which the subject vehicle M will arrive. A torajectory point is a place at which the subject vehicle M will arrive at respective predetermined running distances (for example, about every several [m]) as distances along the road, and separately from that, a target speed and a target acceleration for each of predetermined sampling times (for example, a fraction of a [sec]) are generated as a part of the target torajectory. A torajectory point may be a position at which the subject vehicle M will arrive at a predetermined sampling time for each of the sampling time. In such a case, information of a target speed or a target acceleration is represented using intervals between the torajectory points.

When a target torajectory is generated, the action plan generator 140 may set an event of automated driving. As events of automated driving, there are a constant-speed running event, a low-speed running-behind event, a lane change event, a branching event, a merge event, an overtaking event, an avoidance event, and the like. The action plan generator 140 generates a target torajectory according to operated events. The functions of a notification necessity/non-necessity determiner 142, a margin controller 144, and a switching controller 146 of the action plan generator 140 will be described later.

The second controller 160 performs control of the running driving force output device 200, the brake device 210, and the steering device 220 such that the subject vehicle M passes along a target torajectory generated by the action plan generator 140 at a scheduled time.

The second controller 160, for example, includes an acquisition unit 162, a speed controller 164, and a steering controller 166. The acquisition unit 162 acquires information of a target torajectory (torajectory points) generated by the action plan generator 140 and stores the target torajectory information in a memory (not illustrated). The speed controller 164 controls the running driving force output device 200 or the brake device 210 on the basis of a speed element accompanying the target torajectory stored in the memory. The steering controller 166 controls the steering device 220 in accordance with a degree of curvature of the target torajectory stored in the memory. The processes of the speed controller 164 and the steering controller 166, for example, are realized by a combination of feed forward control and feedback control. For example, the steering controller 166 may execute feed forward control according to the curvature of a road in front of the subject vehicle M and feedback control based on a deviation from the target torajectory in combination.

The HMI controller 180 outputs predetermined information to a vehicle occupant using the HMI 30. Here, the predetermined information, for example, is information for imposing required tasks on a vehicle occupant, information for allowing a vehicle occupant to operate the driving operator 80, and information relating to running of the subject vehicle M such as information relating to a driving mode. The predetermined information may include information relating to surrounding landscape features identified on the basis of the positional information of the subject vehicle M (for example, guidance information based on landscape features) and information not relating to the running of the subject vehicle M such as television programs and contents (for example, movies) stored on a storage medium such as a DVD.

The storage 190, for example, is realized by a nonvolatile storage device such as a read only memory (ROM), an electrically erasable and programmable read only memory (EEPROM), or an HDD and a volatile storage device such as a random access memory (RAM) or a register. For example, a vehicle occupant information DB 192, a notification history 194, and other information are stored in the storage 190.

The running driving force output device 200 outputs a running driving force (torque) used for a vehicle to run to driving wheels. The running driving force output device 200, for example, includes a combination of an internal combustion engine, an electric motor, a transmission, and the like and an electronic controller (ECU) controlling these components. The ECU controls the components described above in accordance with information input from the second controller 160 or information input from the driving operator 80.

The brake device 210, for example, includes a brake caliper, a cylinder that delivers hydraulic pressure to the brake caliper, an electric motor that generates hydraulic pressure in the cylinder, and a brake ECU. The brake ECU performs control of the electric motor in accordance with information input from the second controller 160 or information input from the driving operator 80 such that a brake torque according to a brake operation is output to each vehicle wheel. The brake device 210 may include a mechanism delivering hydraulic pressure generated in accordance with an operation on the brake pedal included in the driving operators 80 to the cylinder through a master cylinder as a backup. The brake device 210 is not limited to the configuration described above and may be an electronically-controlled hydraulic brake device that delivers hydraulic pressure in the master cylinder to a cylinder by controlling an actuator in accordance with information input from the second controller 160.

The steering device 220, for example, includes a steering ECU and an electric motor. The electric motor, for example, changes the direction of the steering wheel by applying a force to a rack and pinion mechanism. The steering ECU changes the direction of the steering wheel by driving an electric motor in accordance with information input from the second controller 160 or information input from the driving operator 80.

[Function of Surrounding Situation Recognizer]

Figure 3:
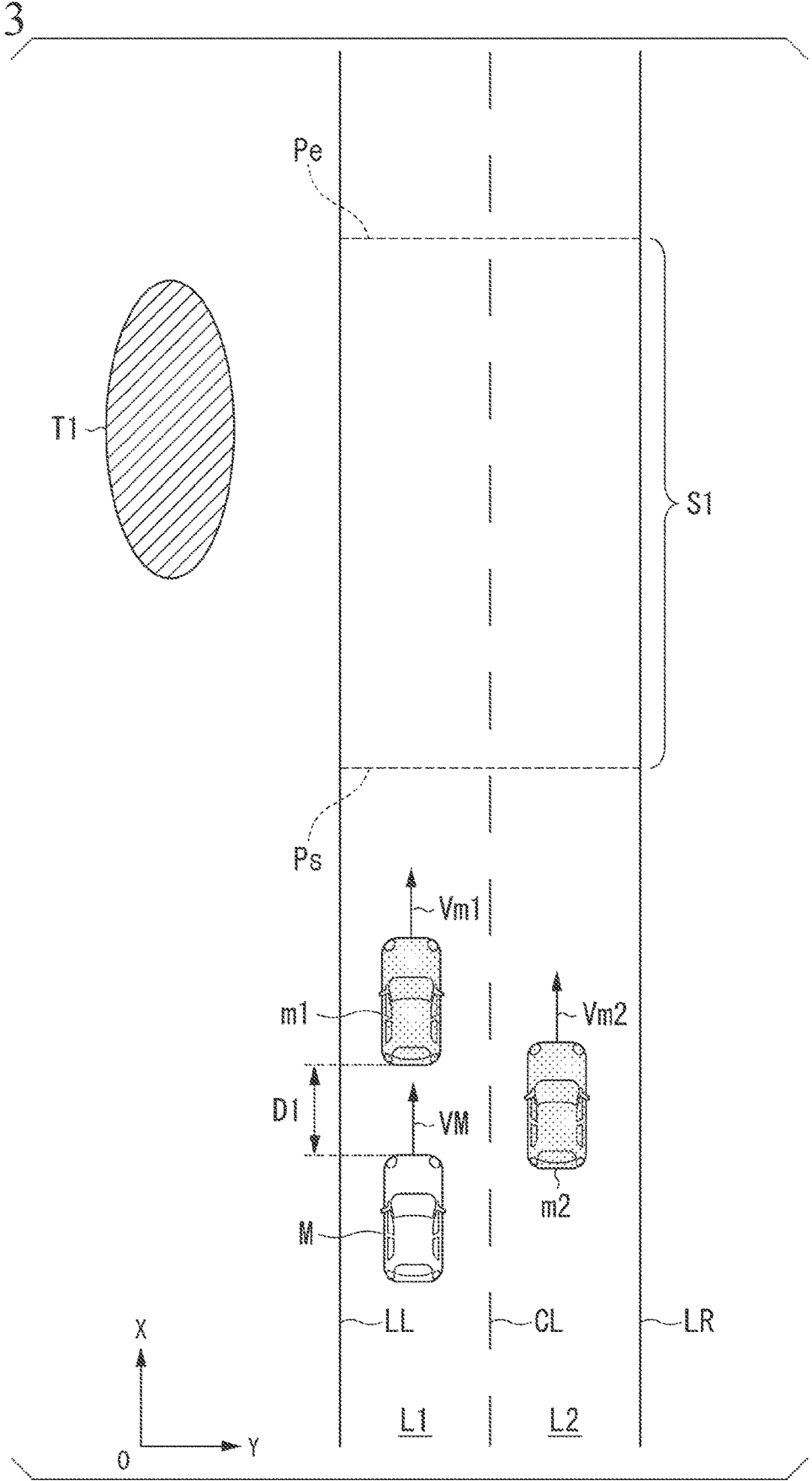
FIG. 3 is a diagram illustrating a process of a surrounding situation recognizer.

The surrounding situation recognizer 132 recognizes a surrounding situation of the subject vehicle M on the basis of information input from the camera 10, the radar device 12, and the finder 14 through the object recognizing device 16. FIG. 3 is a diagram illustrating a process of the surrounding situation recognizer 132. In the example illustrated in FIG. 3, a road on which vehicles can run in two lanes in the same direction is illustrated, and it is assumed that a subject vehicle M runs in a left lane L1 at a speed VM out of lanes L1 and L2 partitioned using road partition lines LL and LR. In the example illustrated in FIG. 3, it is assumed that other vehicles m1 and m2 are present as surrounding vehicles with respect to the subject vehicle M and are advancing in the same direction (a direction X in the drawing) as that of the subject vehicle M at speeds Vm1 and Vm2. In addition, in the example illustrated in FIG. 3, it is assumed that the subject vehicle M performs driving control according to the second driving mode, and a required task of surrounding monitoring is imposed on a vehicle occupant in a case in which the distance is shorter than an inter-vehicle distance D1 in the setting of a degree of margin for the other vehicle m1.

For example, the surrounding situation recognizer 132 recognizes positions and running speeds of the other vehicles m1 and m2 and patterns of the lanes L1 and L2. The surrounding situation recognizer 132, for example, recognizes candidates for a notification target present within a first predetermined distance from the position of the subject vehicle M in the advancement direction of the subject vehicle M. Here, the first predetermined distance, for example, is a distance that is different in accordance with attributes of a landscape feature or the like. The first predetermined distance, for example, may be about 1 to 3 [km] in the case of a building, a landmark, or the like and about 5 to 10 [km] in the case of a large object such as a mountain or a lake. More specifically, the surrounding situation recognizer 132, for example, acquires positional information of the subject vehicle M recognized by the recognizer 130, the positional information of the first map information 54, and information relating to a landscape feature present within the first predetermined distance from the position of the subject vehicle M as candidates for a notification target.

[Function of Vehicle Occupant Identifying Unit]

The vehicle occupant identifying unit 134 identifies a vehicle occupant present in the subject vehicle M. More specifically, first, the vehicle occupant identifying unit 134 acquires identification information (for example, a vehicle occupant ID) of a vehicle occupant. For example, the vehicle occupant identifying unit 134 accepts an input of a vehicle occupant ID in accordance with an operation on the HMI 30 that is performed by a vehicle occupant at a predetermined timing. The predetermined timing, for example, is a timing at which initial registration of a vehicle occupant is performed, a timing at which a vehicle occupant sets a destination, a timing at which driving control according to the second driving mode is started, or the like.

The vehicle occupant identifying unit 134 may acquire feature information of a face by analyzing an image captured by the vehicle indoor camera 90 and acquire a vehicle occupant ID by referring to a collation DB (not illustrated in the drawing) stored in the storage 190 or the like on the basis of the acquired feature information. Here, the feature information, for example, is a contour of a face, relative positions of parts such as the eyes, the nose, the mouth, the ears, and the like inside the area of a face, color information of the skin, and the like. The feature information may be parameters of a classification model acquired through machine learning such as deep learning. The vehicle occupant identifying unit 134 collates the feature information of a face acquired from an image captured by the vehicle indoor camera 90 with feature information of the collation DB and acquires a vehicle occupant ID associated with feature information having the highest similarity. In a case in which the highest similarity is equal to or lower than a predetermined value, the vehicle occupant identifying unit 134 may notify information indicating that a vehicle occupant ID cannot be acquired to a vehicle occupant.

The vehicle occupant identifying unit 134 refers to the vehicle occupant information DB 192 on the basis of the acquired vehicle occupant ID and acquires vehicle occupant information corresponding to the vehicle occupant ID. FIG. 4 is a diagram illustrating one example of contents of the vehicle occupant information DB 192. The vehicle occupant information DB is information in which address information and tastes information are associated with each vehicle occupant ID. The address information, for example, is regional feature information such as an address of a house or company of a vehicle occupant. The address information may include information relating to the hometown of a vehicle occupant. The tastes information, for example, is information relating to attributes of a favorite landscape feature set by a vehicle occupant in advance. The tastes information, for example, may be learned on the basis of the notification history 194 for each vehicle occupant. The vehicle occupant identifying unit 134 collates the acquired vehicle occupant ID with each vehicle occupant ID of the vehicle occupant information DB 192 and acquires address information and tastes information of the matching vehicle occupant ID.

[Function of Notification Necessity/Non-Necessity Determiner]

The notification necessity/non-necessity determiner 142 determines whether or not it is necessary to notify a vehicle occupant of each of candidates for a notification target acquired by the surrounding situation recognizer 132 on the basis of the address information, the hometown information, the tastes information, and the like of a vehicle occupant identified by the vehicle occupant identifying unit 134. For example, in a case in which attributes of a landscape feature included in the tastes information of the vehicle occupant information DB 192 and attributes of a landscape feature of a candidate for a notification target match each other, the notification necessity/non-necessity determiner 142 determines that it is necessary to notify the vehicle occupant of the candidate for a notification target.

For example, in a case in which a distance between the position of a candidate for a notification target and the address of the vehicle occupant is within a second predetermined distance (for example, about 5 to 10 [km]), the notification necessity/non-necessity determiner 142 may exclude the candidate from notification targets. The reason for this is that a landscape feature near the address is considered as being able to be recognized by the vehicle occupant even without notification. By excluding a landscape feature near the address from notification targets, bothersome guidance for a landscape feature being frequently notified at the time of traveling near a house can be prevented, and guidance determined to be necessary can be given for a landscape feature at a destination.

The notification necessity/non-necessity determiner 142 may acquire information relating to presence/absence of interest of a vehicle occupant at the time of a notification of each candidate for a notification target from the notification history 194 stored in the storage 190 and determine that a candidate for a notification target in which the vehicle occupant was interested needs to be notified to the vehicle occupant. FIG. 5 is a diagram illustrating one example of contents of the notification history 194. The notification history 194, for example, is information in which date and time information, a landscape feature ID, and presence/absence of interest are associated with a vehicle occupant ID. The date and time information is a date and time at which a notification target is notified to the vehicle occupant. The presence/absence of interest is a result of estimation of presence/absence of interest of a vehicle occupant for a landscape feature that is estimated by the vehicle occupant state estimator 136 to be described later.

The notification necessity/non-necessity determiner 142 may notify the notification target in a case in which a driving mode executed by the subject vehicle M is the second driving mode and not notify the notification target in a case in which the driving mode is the first driving mode. In this way, guidance information for a landscape feature is notified in the case of a driving mode having a high rate of automation or having less required tasks for a vehicle occupant, and accordingly, more appropriate driving control can be executed.

In a case in which it is determined to notify the vehicle occupant of guidance information based on the landscape feature, the notification necessity/non-necessity determiner 142 sets a position (a notification start position) at which a notification of guidance based on the corresponding landscape feature based on the positional information of the landscape feature will be started. In a case in which information relating to a viewpoint at which a landscape feature can be seen from the inside of the vehicle is registered in the first map information 54 or the like in advance, the notification necessity/non-necessity determiner 142 may acquire the information relating to the viewpoint of the landscape feature from the first map information 54 and set a notification start position on the basis of this acquired information. In the example illustrated in FIG. 3, in a case in which a landscape feature T1 is a notification target, it is assumed that a position Ps in front of the subject vehicle M is determined as a notification start position.

Regarding a notification target for which the notification necessity/non-necessity determiner 142 determines that notification is needed, the HMI controller 180 displays an image relating to the landscape feature T1 using a display device of the HMI 30 or outputs speech using a speaker at a timing at which the subject vehicle M arrives at the guidance start position Ps, whereby guidance based on the landscape feature T1 is notified to the vehicle occupant. The HMI controller 180 may notify that guidance information has been notified by causing a light emitting unit disposed inside the vehicle cabin to emit light.

[Function of Margin Controller]

In a case in which it is determined by the notification necessity/non-necessity determiner 142 that guidance information based on a landscape feature is to be notified, the margin controller 144 sets a degree of margin for a surrounding environment set in driving control after start of a notification using the HMI controller 180 to be larger than that before start of the notification. Here, the setting of the degree of margin to be larger, for example, includes at least one of lengthening a clearance, decreasing a running speed, and the center of the subject vehicle M running along the center of the running lane. The clearance, for example, includes an inter-vehicle distance from a preceding vehicle in a longitudinal direction (an extending direction of a lane; a direction X in the drawing) and includes an offset quantity with respect to other vehicles running parallel in an adjacent lane or an object such as a side wall by the road in a lateral direction (a lane width direction; a direction Y in the drawing). A running speed, for example, includes a legal speed or a speed in the flow of traffic of other surrounding vehicles. A notification being started, for example, represents starting of output of guidance based on a landscape feature using the HMI 30 in accordance with the control of the HMI controller 180. Accordingly, control of setting the degree of margin to be larger may be performed at a timing either in the middle of output or after output.

The margin controller 144 may set the degree of margin to be larger with reference to a predetermined time (for example, about several seconds) before guidance information based on a landscape feature is output by the HMI 30. In such a case, in a case in which it is determined by the notification necessity/non-necessity determiner 142 that guidance information based on a landscape feature is to be notified, the margin controller 144 sets the degree of margin set in driving control at a predetermined time before the notification is started by the HMI controller 180 to be larger than that at the predetermined time before the notification is started. Hereinafter, control for setting the degree of margin to be larger at a timing at which guidance information based on the landscape feature is output by the HMI 30 will be described.

In the example illustrated in FIG. 3, the margin controller 144 performs control such that the degree of margin is set to be large in a section S1 up to a position Pe after passing the notification start position Ps. The section S1 may have a fixed distance or may be set on the basis of an end position of a viewpoint of a landscape feature T1 stored in the first map information 54 or the like in advance.

Figure 6:
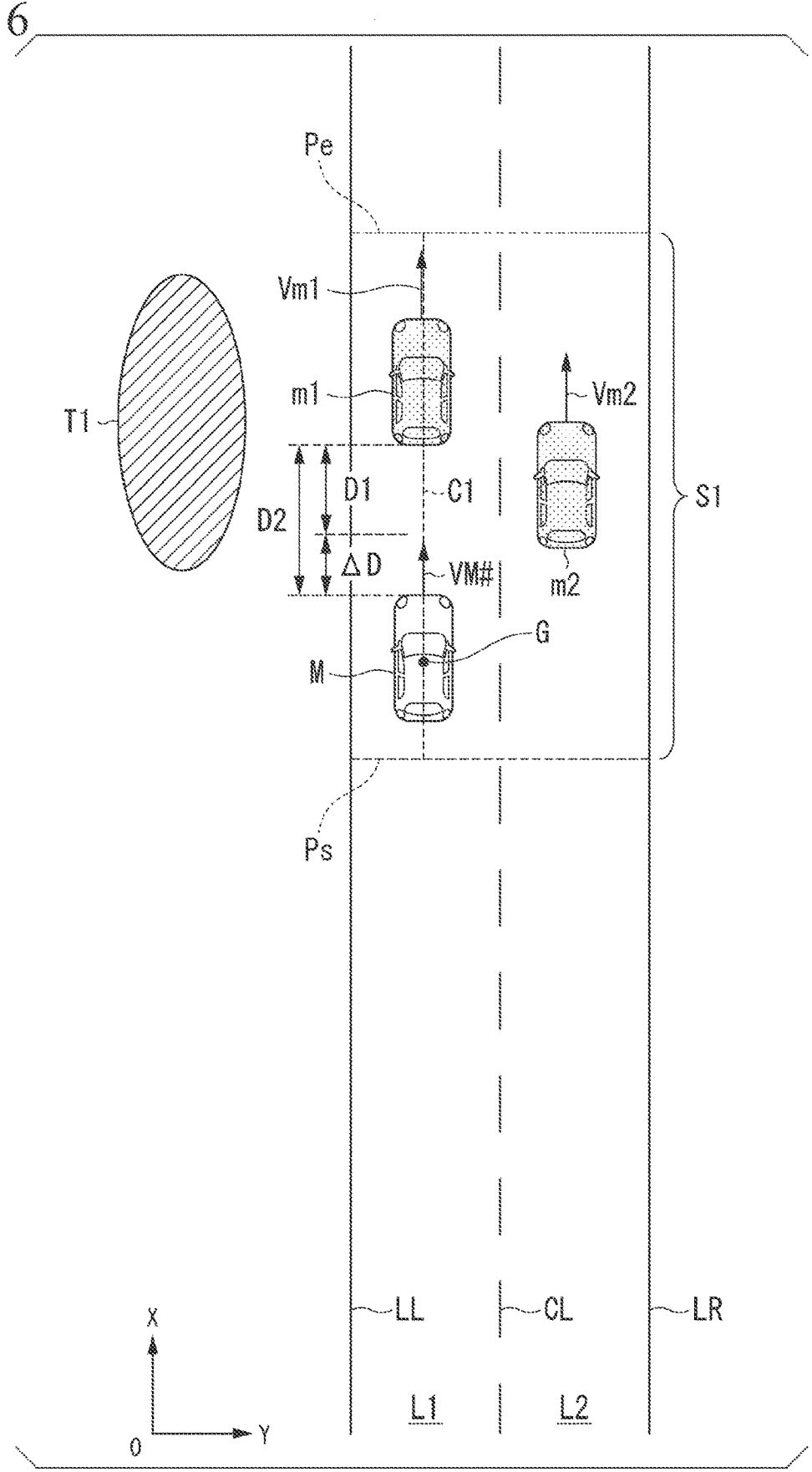
FIG. 6 is a diagram illustrating a process of a margin controller.

FIG. 6 is a diagram illustrating a process of the margin controller 144. In a case in which the subject vehicle M arrives at the notification start position Ps, and guidance based on the landscape feature T1 is started by the HMI 30, the margin controller 144 sets an inter-vehicle distance with respect to another following vehicle m1 to an inter-vehicle distance D2 that is larger than an inter-vehicle distance S1 before the notification of the guidance by a distance AD. In this case, the distance AD may be set on the basis of the speed of the subject vehicle M or may be a fixed distance.

The margin controller 144 may set an interval from another vehicle m2 running in a lane L2 adjacent to the lane L1 in which the subject vehicle M is running to be larger than that before the notification of the guidance based on the landscape feature T1.

In a case in which the speed of the subject vehicle M is higher than a legal speed, the margin controller 144 may perform control of the speed VM# such that the subject vehicle M runs at the legal speed. The margin controller 144 may derive a speed of the flow of traffic from speeds Vm1 and Vm2 of other vehicles m1 and m2 running in the vicinity thereof and control the speed VM# such that the subject vehicle runs at the derived speed. The speed of the flow of traffic, for example, may be an average speed of the speeds Vm1 and Vm2, and the speed of the flow of traffic may be derived using the speed of other vehicle m1 running in the lane L1 in which the subject vehicle M is running. The margin controller 144 may perform control such that the center point of the subject vehicle M passes through the center C1 of the running lane L1. In this way, even in a case in which control of increasing the degree of margin is performed, more appropriate driving control can be performed without causing a vehicle occupant to feel strangeness.

In a case in which it is estimated by the vehicle occupant state estimator 136 that the vehicle occupant is interested in a notified landscape feature T1 after a notification of guidance information based on the landscape feature T1 to the vehicle occupant using the HMI 30, the margin controller 144 may perform control such that the degree of margin of driving control is higher than that before the notification.

[Function of Vehicle Occupant State Estimator]

Figure 7:
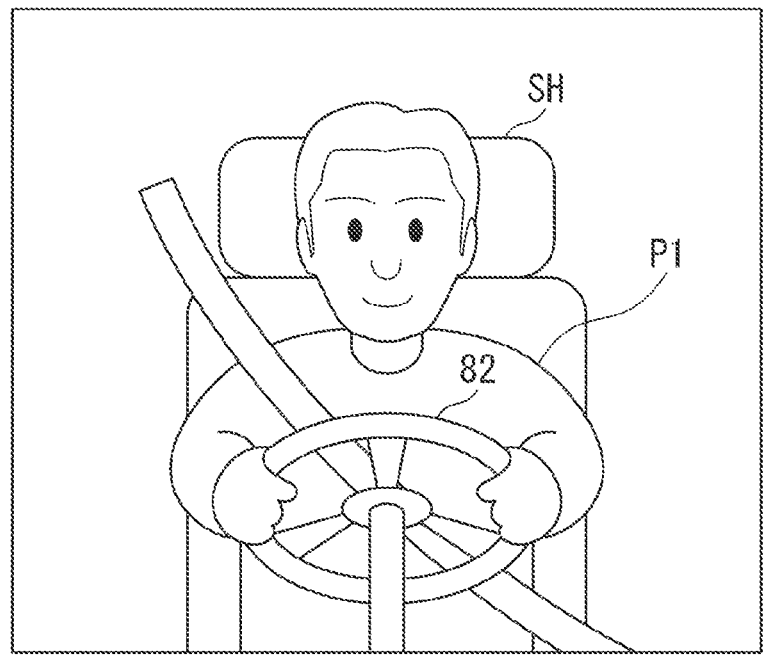
FIG. 7 is a diagram illustrating a process of a vehicle occupant state estimator.

The vehicle occupant state estimator 136, for example, determines whether or not a vehicle occupant is interested in a landscape feature T1 from a specific behavior of the vehicle occupant after a notification of guidance relating to the landscape feature T1 using the HMI 30 on the basis of an image captured by the vehicle indoor camera 90. FIG. 7 is a diagram illustrating a process of the vehicle occupant state estimator 136. In the example illustrated in FIG. 7, a vehicle occupant P1 sitting on a driver's seat SH of a subject vehicle is illustrated. The example of FIG. 7 illustrates a state in which the vehicle occupant P1 sees the front side with a steering wheel 82 that is one example of the driving operator 80 gripped. After the guidance relating to the landscape feature T1 is notified using the HMI 30, the vehicle occupant state estimator 136 analyzes an image captured by the vehicle indoor camera 90 and acquires a direction of a face of the vehicle occupant P1 and the direction of line of sight. For example, the vehicle occupant state estimator 136 detects a positional relation between a head part and the eyes of the vehicle occupant P1, a combination of reference points and moving points of the eyes, and the like using a technique such as template matching. Then, the vehicle occupant state estimator 136 derives the direction of the face on the basis of the positions of the eyes with respect to the head part. The vehicle occupant state estimator 136 derives a direction of the line of sight on the basis of the positions of the moving points with respect to the reference points. For example, in a case in which the reference points are inner corners of the eyes, the moving points are irises. On the other hand, in a case in which the reference points are corneal reflection areas, the moving points are pupils.

Figure 8:
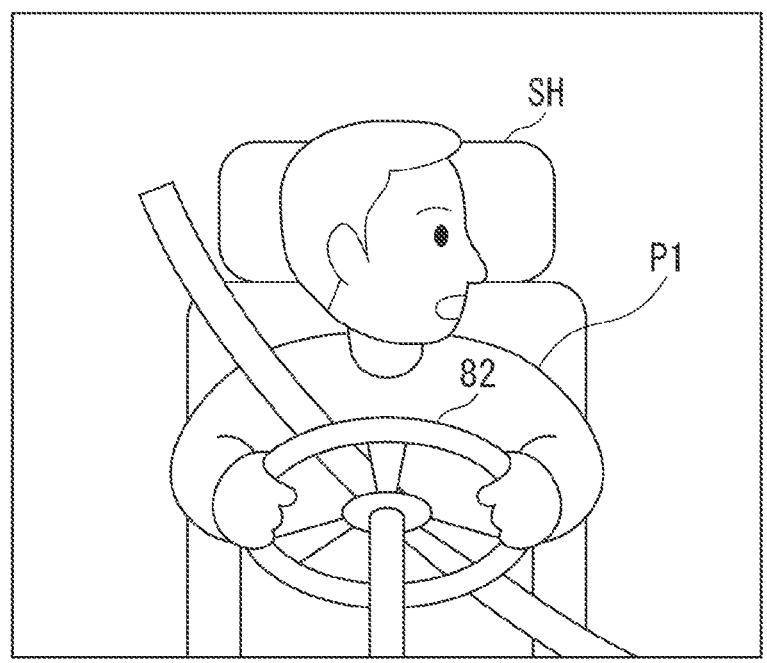
FIG. 8 is a diagram illustrating a process of the vehicle occupant state estimator in a case in which the direction of a face of a vehicle occupant changes.

FIG. 8 is a diagram illustrating a process of the vehicle occupant state estimator 136 in a case in which the direction of a face of a vehicle occupant changes. The vehicle occupant state estimator 136, for example, compares a direction in which the landscape feature T1 is present seen from the subject vehicle M with the direction of the face or the direction of the line of sight and estimates a state in which the vehicle occupant P1 is visually recognizing the landscape feature T1 in a case in which the direction of the face or the direction of the line of sight coincides with or is close to the direction of the landscape feature T1. In a case in which the state in which the vehicle occupant P1 is visually recognizing the landscape feature T1 continues for a predetermined time or more (for example, about 3 [seconds]), the vehicle occupant state estimator 136 estimates that the vehicle occupant is interested in the landscape feature T1.

In the example illustrated in FIG. 8, in a case in which it is estimated that the landscape feature T1 is present on the left side in the advancement direction of the subject vehicle M, and the direction of the face of the vehicle occupant P1 is directed toward the left side for a predetermined time or more (for example, 3 [seconds] or more) after guidance based on the landscape feature T1 is notified, the vehicle occupant state estimator 136 estimates that the vehicle occupant P1 is interested in the landscape feature T1. On the other hand, in a case in which the vehicle occupant P1 faces the front face as illustrated in FIG. 7 also after the guidance is notified, the vehicle occupant state estimator 136 estimates that the vehicle occupant P1 is not interested in the landscape feature T1. Then, the vehicle occupant state estimator 136 stores presence/absence of interest of the vehicle occupant P1, date and time information, and the landscape feature ID in the notification history 194 in association with the vehicle occupant ID. The vehicle occupant state estimator 136, for example, may determine whether or not the vehicle occupant P1 is interested in the landscape feature T1 on the basis of destination setting information or a closely-observing time of the vehicle occupant P1 for an object mark (for example, a building or a sign board) during running.

In a case in which the vehicle occupant P1 expresses interest in the notified landscape feature T1, the margin controller 144 performs driving control of increasing an inter-vehicle distance with respect to other vehicle, decelerating, or the like by increasing the degree of margin. Accordingly, the vehicle occupant P1 can see the guided landscape feature T1 while having time to spare.

For example, even in a case in which a task for performing surrounding monitoring is requested for the vehicle occupant P1, in a case in which the degree of margin is high, the margin controller 144 may set an allowed range of looking aside for the vehicle occupant P1 to be large. Here, the setting of the allowed range of looking aside to be large, for example, includes broadening of the direction of the face in which the vehicle occupant P1 is determined to look aside to a predetermined angle and setting of a time until looking-aside determined is increased by a predetermined time compared to that before the setting of the degree of marge to be large. Accordingly, the vehicle occupant P1 can see the landscape feature T1 without taking care of the operation.

In a case in which a state in which the vehicle occupant P1 is seeing the landscape feature T1 is estimated, the margin controller 144 may estimate that surrounding monitoring in the direction in which the landscape feature T1 is present is performed in the vicinity of the subject vehicle M and perform control of setting the degree of margin to be large for a direction other than the direction in which the landscape feature T1 is present. A direction other than the direction in which the landscape feature T1 is present, for example, is a direction included in a predetermined angle range using a direction opposite to the direction in which the landscape feature T1 is present as a reference.

In a case in which the subject vehicle M arrives at a position Pe in the driving control state in which the degree of margin is set to be large, the margin controller 144 returns the degree of margin to the state before the notification and continues the driving control. In a case in which the vehicle occupant P1 is seeing in a direction other than the landscape feature T1 before the subject vehicle M arrives at the position Pe, the margin controller 144 may return the degree of margin to the state before the notification.

[Function of Switching Controller]

The switching controller 146 performs switching between the first driving mode and the second driving mode on the basis of an action plan generated by the action plan generator 140. In a case in which it is difficult to continue the second driving mode on the basis of the surrounding situation of the subject vehicle M, the switching controller 146 may switch the driving mode from the second driving mode to the first driving mode. The switching controller 146, for example, may change the driving mode on the basis of an operation signal input from a predetermined switch included in the HMI 30 or may switch the driving mode from the second driving mode to the first driving mode on the basis of an operation directing acceleration, deceleration, or steering for the driving operator 80 such as a steering wheel 82, an acceleration pedal, a brake pedal, or the like.

Modified Example

For example, in a case in which a plurality of vehicle occupants are present in the subject vehicle M, the notification necessity/non-necessity determiner 142 may determine whether or not a notification of guidance for a landscape feature is necessary for each of the vehicle occupants and determine the guidance for the landscape feature as a notification target in a case in which the number of vehicle occupants for which a notification is determined to be necessary is equal to or larger than the number of vehicle occupants for which a notification is determined not to be necessary. In such a case, the HMI controller 180 may output information to the plurality of vehicle occupants present inside the vehicle.

In a case in which a plurality of vehicle occupants are present in the subject vehicle M and in a case in which it is determined that a vehicle occupant sitting on a driver's seat faces a landscape feature, and the other vehicle occupants do not face the landscape feature, the vehicle occupant state estimator 136 may notify the HMI 30 of direction information for imposing a task of surrounding monitoring of the subject vehicle M on the other vehicle occupants.

[Process Flow]

Figure 9:
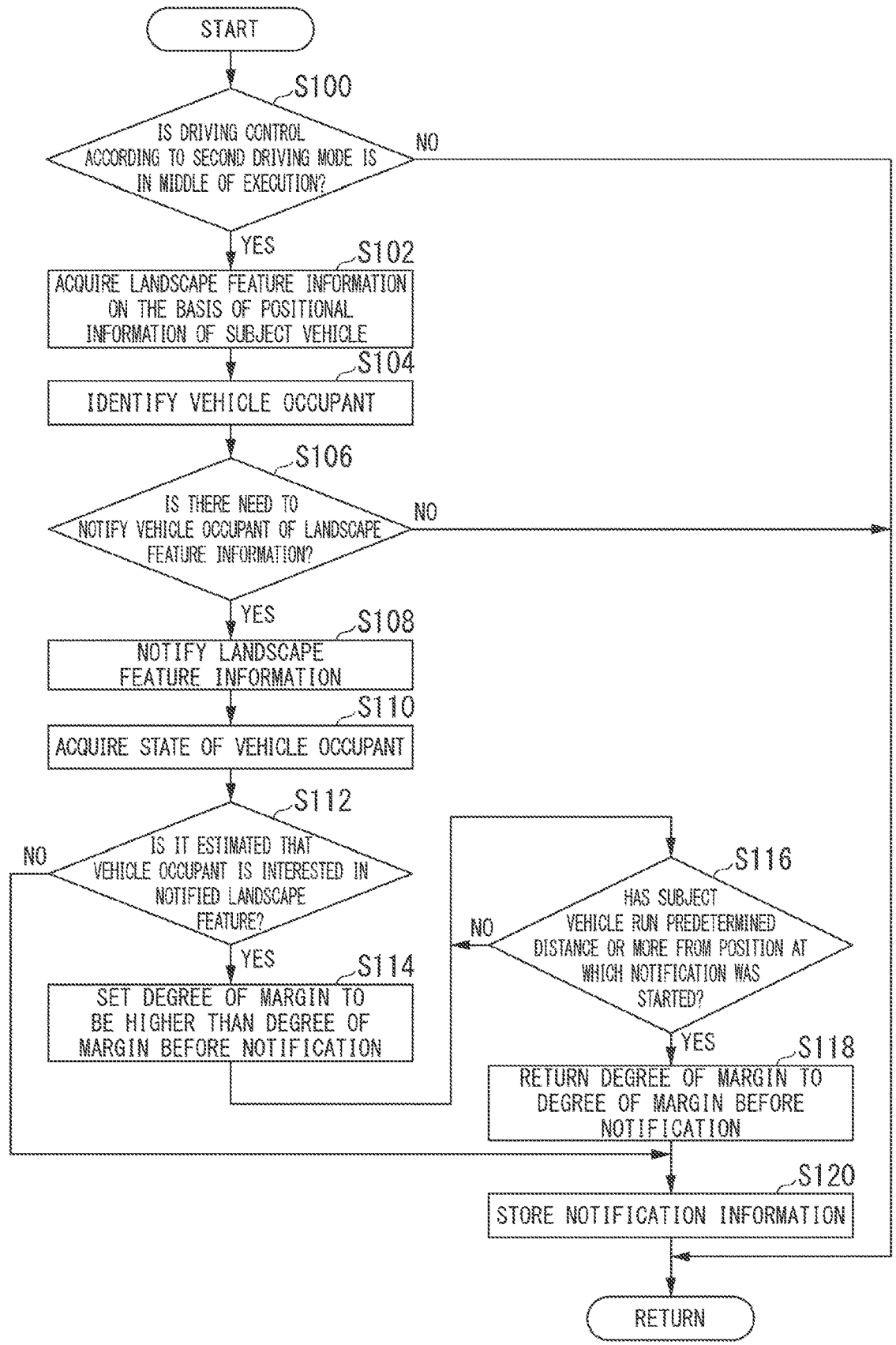
FIG. 9 is a flowchart illustrating the flow of a process executed by an automated driving control device according to an embodiment.

FIG. 9 is a flowchart illustrating the flow of a process executed by the automated driving control device 100 according to an embodiment. The process of this flowchart, for example, may be repeatedly executed at predetermined intervals or at predetermined timings. When the process of this flowchart starts, it is assumed that a target torajectory is generated by the action plan generator 140, and driving control is executed by the second controller 160 on the basis of the generated target torajectory.

First, the notification necessity/non-necessity determiner 142 determines whether or not driving control according to the second driving mode is in the middle of execution in the subject vehicle M (Step S100). In a case in which the driving control according to the second driving mode is in the middle of execution, the surrounding situation recognizer 132 acquires landscape feature information on the basis of positional information of the subject vehicle M (Step S102). Next, the vehicle occupant identifying unit 134 identifies a vehicle occupant of the subject vehicle M (Step S104). Next, the notification necessity/non-necessity determiner 142 determines whether or not there is a need to notify the vehicle occupant of landscape feature information on the basis of the landscape feature information and a result of the identification of the vehicle occupant (Step S106). In a case in which it is determined that there is a need to notify the vehicle occupant of the landscape feature information, guidance based on the landscape feature is notified to the HMI controller 180 using the HMI 30 (Step S108). Next, the vehicle occupant state estimator 136 acquires a state of the vehicle occupant after the notification of the guidance based on the landscape feature (Step S110) and determines whether or not it is estimated that the acquired state of the vehicle occupant indicates that the vehicle occupant is interested in the notified landscape feature (Step S112). In a case in which it is estimated that the vehicle occupant is interested in the notified landscape feature, the margin controller 144 sets the degree of margin to be larger than the degree of margin before the notification (Step S114).

Next, the margin controller 144 determines whether or not the subject vehicle has run a predetermined distance or more from a position at which the notification of the guidance information based on the landscape feature was started (Step S116). The margin controller 144 maintains the driving control according to the current degree of margin until the subject vehicle runs a predetermined distance or more and returns the degree of margin to the degree of margin before the notification in a case in which it is determined that the subject vehicle has run the predetermined distance or more (Step S118). Next, after the process of Step S118 or in the process of Step S112, in a case in which it is determined that it is not estimated that the vehicle occupant is interested in the notified landscape feature, the margin controller 144 stores the result in the notification history 194 for each of the vehicle occupants (Step S120). In this way, the process of this flowchart ends. In a case in which the driving control according to the second driving mode is not in the middle of execution in the process of Step S100, and in a case in which it is determined that there is no need to notify the vehicle occupant of the landscape feature information in the process of Step S106, the process of this flowchart ends.

In this embodiment, for example, in a case in which, although the vehicle occupant looks aside, it is detected that the vehicle occupant has ended looking-aside or is engaged in driving before the subject vehicle runs a predetermined distance after the looking aside, the margin controller 144 may perform control of gradually returning the degree of margin to the original degree of margin. The margin controller 144 may set a degree of change at the time of returning the degree of margin to be changed in accordance with an increased time of the degree of margin. In such a case, the margin controller 144, for example, performs control of returning to the original degree of margin (or the original speed) over four seconds in a case in which the vehicle occupant has looked aside for 10 seconds and returning to the original degree of margin over six seconds in a case in which the vehicle occupant has looked for 15 seconds.

According to the embodiment described above, the automated driving control device 100 includes the recognizer 130 recognizing a surrounding situation of the subject vehicle M, a driving controller (the action plan generator 140 and the second controller 160) executing driving control by controlling one or both of steering and acceleration/deceleration of the subject vehicle on the basis of the surrounding situation recognized by the recognizer 130, and the HMI 30 notifying the vehicle occupant of predetermined information, and the driving controller sets the degree of margin for the surrounding environment set in driving control after start of a notification of predetermined information using the HMI 30 to be higher than that before start of the notification of the predetermined information, whereby more appropriate driving control can be executed also in a case in which the vehicle occupant performs a predetermined behavior not relating to the running of the vehicle.

In the embodiment described above, instead of guidance based on a landscape feature, for example, guidance for inquiring about viewing of television programs and contents such as movies may be notified to the vehicle occupant. In such a case, in a case in which a state in which the vehicle occupant is watching a television program or a content is estimated by the vehicle occupant state estimator 136, the margin controller 144 performs control of setting the degree of margin to be higher than that before start of the notification.

In this way, in this embodiment, when a second task such as guiding sightseeing to a vehicle occupant, TV program viewing for a vehicle occupant, or the like is performed, the driving consciousness of the vehicle occupant decreases, and a time required for switching from the second driving mode to the first driving mode becomes long. For this reason, in the embodiment described above, in a case in which the vehicle occupant performs a specific behavior not relating to the running of the vehicle, by setting the degree of margin to be large in driving control, whereby a marginal time for driving switching at the time of avoiding an obstacle can be increased while decreasing a likelihood of being in contact with the obstacle.

[Hardware Configuration]

Figure 10:
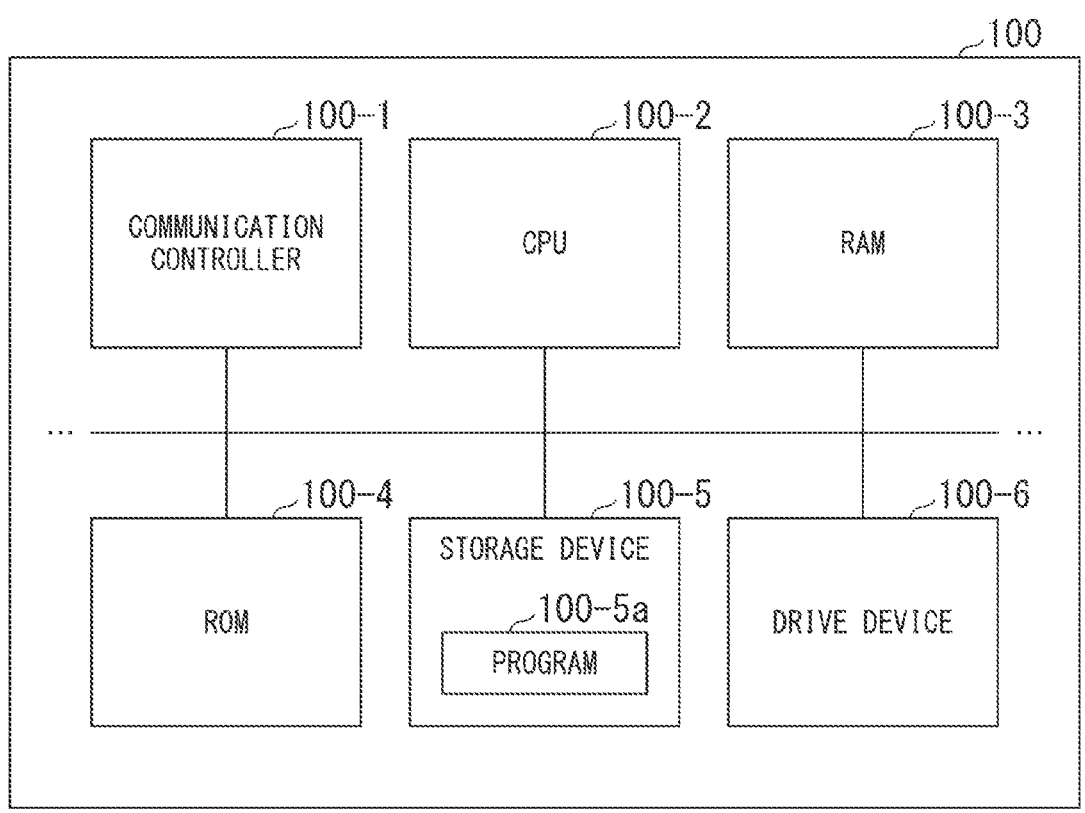
FIG. 10 is a diagram illustrating one example of the hardware configuration of an automated driving control device according to an embodiment.

FIG. 10 is a diagram showing one example of the hardware configuration of the automated driving control device 100 according to an embodiment. As illustrated in the drawing, the automated driving control device 100 has a configuration in which a communication controller 100-1, a CPU 100-2, a RAM 100-3 used as a working memory, a ROM 100-4 storing a boot program and the like, a storage device 100-5 such as a flash memory or an HDD, a drive device 100-6, and the like are interconnected through an internal bus or a dedicated communication line. The communication controller 100-1 communicates with constituent elements other than the automated driving control device 100. A program 100-5a executed by the CPU 100-2 is stored in the storage device 100-5. This program is expanded into the RAM 100-3 by a direct memory access (DMA) controller (not illustrated in the drawing) or the like and is executed by the CPU 100-2. In this way, some or all of the first controller 120, the second controller 160, the HMI controller 180, and the storage 190 of the automated driving control device 100 are realized.

The embodiment described above can be represented as below.

A vehicle control device including a storage device storing a program and a hardware processor and configured such that the hardware processor, by executing the program stored in the storage device, recognizes a surrounding situation of a subject vehicle, executing driving control of controlling one or both of steering and acceleration/deceleration of the subject vehicle on the basis of the recognized surrounding situation, notifies a vehicle occupant of the subject vehicle of predetermined information, and sets a degree of margin for a surrounding environment set in the driving control after start of the notification of the predetermined information to be higher than that before start of the notification of the predetermined information.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
   a recognizer that recognizes a surrounding situation of a subject vehicle;
   a driving controller that executes driving control of controlling one or both of steering and acceleration/deceleration of the subject vehicle on the basis of the surrounding situation recognized by the recognizer; and a notifier that notifies a vehicle occupant of the subject vehicle of predetermined information, wherein the driving controller sets a degree of margin for a surrounding environment set in the driving control after start of the notification of the predetermined information using the notifier to be higher than that before start of the notification of the predetermined information.

2. The vehicle control device according to claim 1, further comprising a vehicle occupant state estimator that estimates a state of the vehicle occupant of the subject vehicle, wherein, in a case in which it is estimated by the vehicle occupant state estimator that the vehicle occupant has performed a specific behavior after the notification of the predetermined information using the notifier, the driving controller sets the degree of margin for the surrounding environment set in the driving control to be higher than that before start of the notification of the predetermined information.

3. The vehicle control device according to claim 1, wherein the predetermined information includes guidance information based on a landscape feature.

4. The vehicle control device according to claim 1, wherein the driving controller determines whether or not there is a need to notify the vehicle occupant of the predetermined information and causes the notifier to notify the predetermined information in a case in which it is determined that there is a need to notify the vehicle occupant.

5. The vehicle control device according to claim 4, wherein the driving controller determines whether or not there is a need to notify the vehicle occupant of the predetermined information on the basis of presence/absence of interest of the vehicle occupant in the predetermined information.

6. The vehicle control device according to claim 1, wherein the vehicle occupant includes a driver and a passenger of the subject vehicle.

7. The vehicle control device according to claim 1, wherein the driving controller executes the driving control in a plurality of modes including a first driving mode and a second driving mode having a rate of automation of the driving control which is higher than in the first driving mode or having less required tasks for the vehicle occupant than in the first driving mode and causes the notifier to notify predetermined information in a case in which driving control according to the second driving mode is executed.

8. The vehicle control device according to claim 1, wherein the degree of margin includes at least one of a clearance between the subject vehicle and another vehicle, a speed of the subject vehicle, and a running position of the subject vehicle.

9. A vehicle control device comprising:

a recognizer that recognizes a surrounding situation of a subject vehicle;

a driving controller that executes driving control of controlling one or both of steering and acceleration/deceleration of the subject vehicle on the basis of the surrounding situation recognized by the recognizer; and a notifier that notifies a vehicle occupant of the subject vehicle of predetermined information, wherein the driving controller sets a degree of margin for a surrounding environment set in the driving control after a predetermined time before start of the notification of the predetermined information using the notifier to be higher than that before the predetermined time before start of the notification of the predetermined information.

10. A vehicle control method using a vehicle control device, the vehicle control method comprising:

recognizing a surrounding situation of a subject vehicle;

executing driving control of controlling one or both of steering and acceleration/deceleration of the subject vehicle on the basis of the recognized surrounding situation;

notifying a vehicle occupant of the subject vehicle of predetermined information; and setting a degree of margin for a surrounding environment set in the driving control after start of the notification of the predetermined information to be higher than that before start of the notification of the predetermined information.

11. A computer-readable non-transitory storage medium having a program stored thereon, the program causing a vehicle control device to execute:

recognizing a surrounding situation of a subject vehicle;

executing driving control of controlling one or both of steering and acceleration/deceleration of the subject vehicle on the basis of the recognized surrounding situation;

notifying a vehicle occupant of the subject vehicle of predetermined information; and setting a degree of margin for a surrounding environment set in the driving control after start of the notification of the predetermined information to be higher than that before start of the notification of the predetermined information.

\* \* \* \* \*